June 28, 1938.    W. KOHLHAGEN    2,122,374
SELF STARTING SYNCHRONOUS ELECTRIC MOTOR
Filed Nov. 6, 1936

Inventor
Walter Kohlhagen
By Seymour Earle & Nichols
Attorneys

Patented June 28, 1938

2,122,374

UNITED STATES PATENT OFFICE 2,122,374

SELF-STARTING SYNCHRONOUS ELECTRIC MOTOR

Walter Kohlhagen, Waterbury, Conn., assignor to The Waterbury Clock Company, Waterbury, Conn., a corporation of Connecticut Application November 6, 1936, Serial No. 109,453

5 Claims. (Cl. 172—278)

This invention relates to an improvement in synchronous electric motors and particularly to synchronous electric motors of the self-starting type.

One of the objects of the present invention is to provide a superior self-starting synchronous motor characterized by ease and low cost for manufacture.

A further object is to provide a superior self-starting synchronous motor in which the self-starting torque and the synchronous torque are so balanced as to insure that the motor will both self-start and operate synchronously under adverse conditions.

Another object is to provide a superior self-starting synchronous motor which will continue synchronous operation despite appreciable changes in the voltage of the current supplied thereto.

With the above and other objects in view, as will appear to those skilled in the art from the present disclosure, this invention includes all features in the said disclosure which are novel over the prior art.

Figure 1:
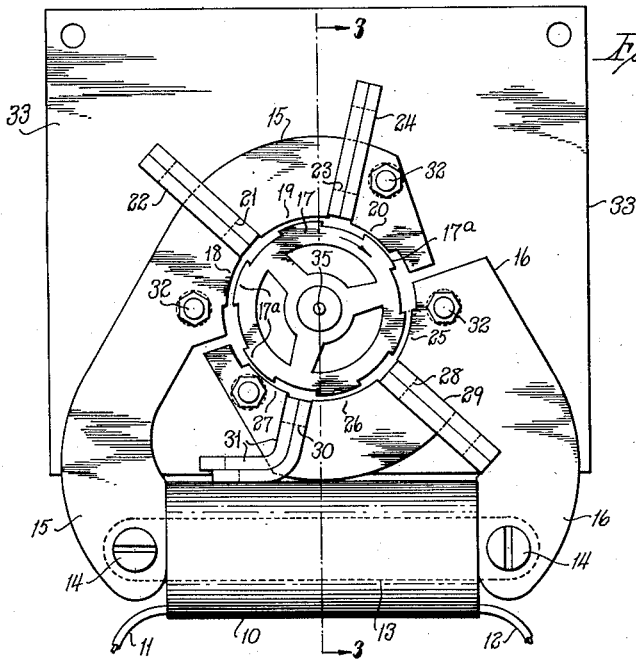
Fig. 1 is a face view of one form which a self-starting synchronous motor may assume in accordance with the present invention.
Figure 2:
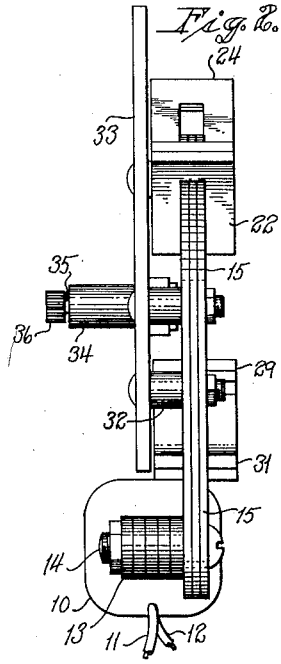
Fig. 2 is an edge view thereof.
Figure 3:
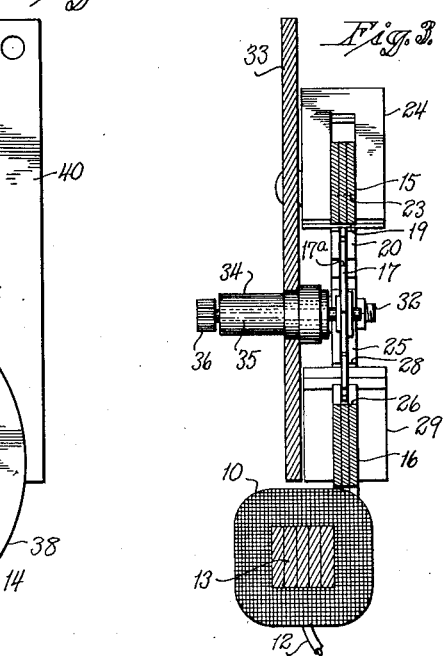
Fig. 3 is a transverse sectional view thereof taken on the line 3—3 of Fig. 1.

The embodiment of the present invention chosen for illustration in Figs. 1 to 3 inclusive, includes an energizing-coil 10 having complementary leads 11 and 12 by means of which the said coil may be connected to a source of alternating current of commercial frequency. Extending through the energizing-coil 10 is a laminated core 13 of magnetic material, such as soft iron or steel, which is rigidly attached at its respective opposite ends by means of bolts 14—14 to the outer ends of complementary pole-pieces 15 and 16 respectively. Like the core-piece 13, the pole-pieces 15 and 16 just referred to are laminated and are formed of similar magnetically permeable material.

The pole-piece 15 projects around the portion of the periphery of a rotor 17 most remote from the energizing-coil 13 while the complementary pole-piece 16 extends adjacent the portion of the periphery of the said rotor nearest the said energizing-coil 13.

The pole-piece 15 is formed with three (or more) polar-projections 18, 19 and 20 which project into close proximity to the rotor 17 and which, for convenience of description, may be respectively designated as "primary," "secondary" and "tertiary." Intermediate the primary polar-projection 18 and the secondary polar-projection 19 the pole-piece 15 is formed in its inner edge with a notch 21 into which fits a laminated shading-coil 22 formed of copper or other suitable high-conductive material and which encircles the flux-path to both the polar-projections 19 and 20. Similarly, between the secondary polar-projection 19 and the tertiary polar-projection 20 the said pole-piece 15 is provided in its inner edge with a notch 23 receiving the inner portion of a laminated shading-coil 24, which latter thus surrounds the flux-path between the polar-projections 19 and 20.

Like the pole-piece 15, the pole-piece 16 is provided with three (more or less) polar-projections 25, 26 and 27 respectively positioned diametrically opposite to the polar-projections 18, 19 and 20 of the said pole-piece 15. For similar reasons, the polar-projections 25, 26 and 27 of the pole-piece 16 may be respectively designated as "primary," "secondary" and "tertiary."

Intermediate its polar-projections 25 and 26 the pole-piece 16 is formed in its inner edge with a notch 28 receiving the inner portion of a laminated shading-coil 29. In a similar manner, intermediate its polar-projections 26 and 27, the pole-piece 16 is formed in its inner edge with a notch 30 receiving the inner portion of a laminated shading-coil 31 which latter may, as shown in Fig. 1, have its outer portion deflected into parallelism with the energizing-coil 13 so as to enable the said energizing-coil to be located more closely to the rotor 17 than would otherwise be the case.

The pole-pieces 15 and 16 and hence the parts carried thereby are rigidly attached, through the intermediary of studs or pillars 32, to one face of a rectangular assembly-plate 33, one edge of which extends in parallelism with the energizing-coil 10 closely adjacent the inner face thereof. The said assembly-plate 33 carries a bearing 34 through which extends and in which bears a shaft 35. One end of the shaft 35 is rigidly attached to the rotor 17 before referred to, and to the opposite end of the said shaft is rigidly attached a drive-pinion 36 by means of which the power developed by the said rotor 17 may be applied to a clock-train or the like.

The rotor 17 is preferably made of permanent magnet material such, for instance, as a carbon-steel having a carbon content of about 0.12%, and has, as shown, an annular series of salient poles or polar-projections 17a which correspond in number to the combined total of the polar-projections on the pole-pieces 15 and 16.

Preferably and as shown in Fig. 1, the gaps between the rotor 17 and the tertiary polar-projections 20 and 27 are relatively small (.008" for instance) as compared to the gaps between the said rotor and the other polar-projections. The gaps between the secondary polar-projections 19 and 26 and the rotor 17 are relatively larger (.014" for instance) and the gaps between the primary polar-projections 18 and 25 are in turn greater still (.020" for instance).

When alternating current of commercial frequency is supplied to the energizing-coil 10 by means of its leads 11 and 12, magnetic flux will be supplied to both the pole-pieces 15 and 16 to exert a rotary synchronous torque upon the rotor 17.

As will be noted by reference to Fig. 1 in particular, flux may pass to the primary polar-projections 18 and 25 relatively freely as compared to the other polar-projections of the stator structure. Due to the intervention of the shading-coils 22 and 29, the magnetic flux reaching the secondary polar-projections 19 and 26 will have a time lag with respect to the flux reaching the primary polar-projections 18 and 25 respectively.

Owing to the intervention of the shading-coils 24 and 31, the magnetic flux reaching the tertiary polar-projections 20 and 27 will have a time-lag with respect to the flux reaching the secondary polar-projections 19 and 26 and hence have a double time-lag with respect to the primary polar-projections 18 and 25.

By progressively decreasing the air-gap between the rotor 17 and the primary, secondary and tertiary polar-projections respectively, as before described, adequate compensation is made for any weakening in the flux-density which might be due to the intervention of the various shading-coils.

By means of the stator-structure above described, a strong self-starting torque will be initially applied to the rotor 17 to bring the same up to its synchronous speed, which in the structure illustrated is 3600 R. P. M. While the structure is characterized by strong synchronous torque, it will be found that this synchronous torque will not interfere with the starting of the rotor and the bringing of the same up to its synchronous speed. Furthermore, the motor illustrated will be free of either locking-tendencies or over-speeding tendencies, despite appreciable variations in the voltage of the alternating current supplied to the energizing-coil 13.

Figure 4:
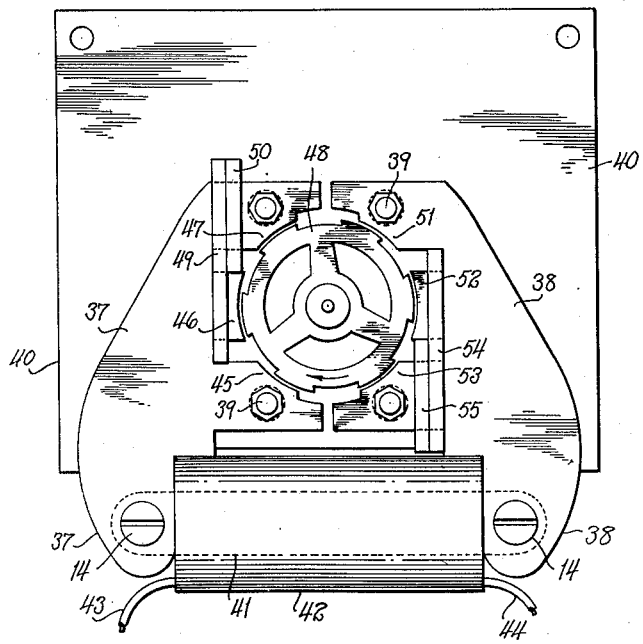
Fig. 4 is a face view of another form which a self-starting synchronous motor may assume in accordance with the present invention.

In the motor-structure of Fig. 4, two complementary opposed pole-pieces 37 and 38 are secured by means of pillars 39 to a mounting-plate 40. The outer ends of the pole-pieces 37 and 38 are interconnected by a core-piece 41 upon which is mounted an energizing-coil 42 having complementary leads 43 and 44 by means of which the said coil may be connected to a source of alternating current of commercial frequency.

The pole-piece 37 is provided with a primary polar-projection 45, a secondary polar-projection 46 and a tertiary polar-projection 47, all of which extend into close proximity to a rotor 48 corresponding to the rotor 17 before described. Enveloping the path through which the flux must travel from the energizing-coil 42 to both the secondary and tertiary polar-projections 46 and 47 is a relatively-large shading-coil 49 which serves to produce a time-lag in the magnetic flux reaching the said secondary polar-projections 46 and 47 as compared to the flux reaching the unshaded primary polar-projection 45. To effect a time-lag in the magnetic flux reaching the tertiary polar-projection 47 as compared to the magnetic-flux reaching the secondary polar-projection, the base of the former is also encircled by a second, but relatively-small, shading-coil 50.

The pole-piece 38 is provided with a primary polar-projection 51, a secondary polar-projection 52 and a tertiary polar-projection 53. The path through which the magnetic flux must pass from the coil 42 in order to reach the secondary and tertiary polar-projections 52 and 53 is encircled by a shading-coil 54 corresponding to the shading-coil 49 before described. The base of the tertiary polar-projection 53 is also encircled by a second shading-coil 55 which serves to cause a time-lag in the magnetic flux reaching the said polar-projection 53 as compared to the magnetic flux reaching the secondary polar-projection 52 and hence a double time-lag with respect to the magnetic flux reaching the primary polar-projection 51.

Owing largely to the sequences at which the magnetic flux becomes effective in the various polar-projections, it will be found that the motor-structure of Fig. 4 will both self-start and reach synchronous speed, at which latter speed an adequate amount of synchronous torque will be developed without tendencies for the rotor to hunt.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A self-starting synchronous electric motor comprising: a rotor having a plurality of salient poles; a stator-structure including an energizing-coil and one or more pole-pieces having a primary polar-projection, a secondary polar-projection and a tertiary polar-projection all extending into positions adjacent the path of the salient poles of the said rotor, the said primary polar-projection substantially corresponding in length in the direction of rotor-rotation to the similar length of the salient poles of the said rotor and the combined lengths of the said secondary and tertiary polar-projections in the direction of rotor-rotation being in excess of the length in a similar direction of the said primary polar-projection; and shading-coil means constructed and arranged on the said pole-piece in such manner as to cause a magnetic-flux time-lag in the said secondary polar-projection as compared to the said primary polar-projection and also causing a magnetic-flux time-lag in the said tertiary polar-projection as compared to the said secondary and primary polar-projections.

2. A self-starting synchronous electric motor comprising: a salient-pole permanent-magnet rotor; a stator-structure including an energizing-coil and a plurality of pole-pieces, one at least of which is provided with a primary polar-projection, a secondary polar-projection and a tertiary polar-projection, all of which polar-projections extend adjacent the salient-pole permanent-magnet rotor, the said primary polar-projection substantially corresponding in length in the direction of rotor-rotation to the similar length of the salient poles of the said rotor and the combined lengths of the said secondary and tertiary polar-projections in the direction of rotor-rotation being in excess of the length in a similar direction of the said primary polar-projection; and shading-coil means constructed and arranged on the said pole-piece in such manner as to cause a magnetic-flux time-lag in the said secondary polar-projection as compared to the said primary polar-projection and also causing a magnetic-flux time-lag in the said tertiary polar-projection as compared to both the said secondary polar-projection and the said primary polar-projection.

3. A self-starting synchronous electric motor comprising: a permanent-magnet rotor having at least six salient poles; a stator-structure including an energizing-coil and a pair of complementary pole-pieces each having a primary polar-projection, a secondary polar-projection and a tertiary polar-projection, all of which projections extend into a position adjacent the path of movement of the salient-teeth of the said permanent-magnet rotor, the said primary polar-projection substantially corresponding in length in the direction of rotor-rotation to the similar length of the salient poles of the said rotor and the combined lengths of the said secondary and tertiary polar-projections in the direction of rotor-rotation being in excess of the length in a similar direction of the said primary polar-projection; and shading-coil means constructed and arranged on each of the said pole-pieces in such manner as to cause a magnetic-flux time-lag in the said secondary polar-projections as compared to the said primary polar-projections and also causing a magnetic-flux time-lag in the said tertiary polar-projections as compared to the said secondary polar-projections and primary polar-projections.

4. A self-starting synchronous electric motor comprising: a rotor having salient poles; a stator-structure including an energizing-coil and a plurality of pole-pieces, one at least of which is provided with a primary polar-projection, a secondary polar-projection and a tertiary polar-projection, all of which polar-projections extend adjacent the said rotor, the said primary polar-projection substantially corresponding in length in the direction of rotor-rotation to the similar length of the salient poles of the said rotor and the combined lengths of the said secondary and tertiary polar-projections in the direction of rotor-rotation being in excess of the length in a similar direction of the said primary polar-projection, the said tertiary polar-projection extending closer to the said rotor than does the said primary polar-projection; and shading-coil means constructed and arranged on the said pole-piece in such manner as to cause a magnetic-flux time-lag in the said secondary polar-projection as compared to the said primary polar-projection and also causing a magnetic-flux time-lag in the said tertiary polar-projection as compared to both the said secondary and primary polar-projections.

5. A self-starting synchronous electric motor comprising: a rotor; a stator-structure including an energizing-coil and a plurality of pole-pieces, one at least of which is provided with a primary polar-projection, a secondary polar-projection and a tertiary polar-projection, all of which polar-projections extend adjacent the said rotor, the said tertiary polar-projection extending closer to the said rotor than do the said secondary and primary polar-projections and the said secondary polar-projection extending closer to the said rotor than does the said primary polar-projection; and shading-coil means constructed and arranged on the said pole-piece in such manner as to cause a magnetic-flux time-lag in the said secondary polar-projection as compared to the said primary polar-projection and also causing a magnetic-flux time-lag in the said tertiary polar-projection as compared to both the said secondary and primary polar-projections.

WALTER KOHLHAGEN.